US007162229B2

(12) United States Patent
Kazakevich

(10) Patent No.: US 7,162,229 B2
(45) Date of Patent: Jan. 9, 2007

(54) METHOD AND SYSTEM FOR TRANSMITTING DATA BETWEEN PERSONAL COMMUNICATION DEVICES

(75) Inventor: Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/300,996

(22) Filed: Nov. 21, 2002

(65) Prior Publication Data

US 2004/0198224 A1    Oct. 7, 2004

Related U.S. Application Data

(60) Provisional application No. 60/391,852, filed on Jun. 26, 2002.

(51) Int. Cl.
*H04M 3/00* (2006.01)
*H04B 7/00* (2006.01)

(52) U.S. Cl. .................. 455/418; 455/412.1; 455/517; 455/420; 455/419

(58) Field of Classification Search ............... 455/418, 455/419, 420, 517, 41.1, 41.2, 41.3
See application file for complete search history.

(56) References Cited

U.S. PATENT DOCUMENTS 5,062,132 A * 10/1991 Yasuda et al. ............... 455/557
5,930,703 A    7/1999 Cairns et al.
5,974,312 A * 10/1999 Hayes et al. ................ 455/419
6,034,621 A *  3/2000 Kaufman .................... 340/7.21
6,064,880 A *  5/2000 Alanara ...................... 455/419
6,177,860 B1 * 1/2001 Cromer et al. ............. 340/10.1
6,321,095 B1 * 11/2001 Gavette ...................... 455/517
6,430,601 B1 *  8/2002 Eldridge et al. ............ 709/206
6,633,759 B1 * 10/2003 Kobayashi .................. 455/419
6,975,854 B1 * 12/2005 Kee ........................ 455/414.1
2002/0004386 A1 * 1/2002 Simon ........................ 455/419

FOREIGN PATENT DOCUMENTS

EP    1 089 578     4/2001
EP    1089578  A2  4/2001

* cited by examiner

*Primary Examiner*—Matthew D. Anderson
*Assistant Examiner*—Yuwen Pan
(74) *Attorney, Agent, or Firm*—Volpe and Koenig, P.C.

(57) ABSTRACT

A system and method for transmitting user data between personal communication devices is disclosed. User data may be electronically transmitted between personal communication devices using hardwired interfaces, optical interfaces, and cellular communication networks. User data may also be stored in a cellular communications network for electronic transmission between the network and personal communication devices as desired.

4 Claims, 2 Drawing Sheets

METHOD AND SYSTEM FOR TRANSMITTING DATA BETWEEN PERSONAL COMMUNICATION DEVICES

CROSS REFERENCE TO RELATED APPLICATION

This application claims priority from U.S. Provisional Application No. 60/391,852, filed on Jun. 26, 2002, which is incorporated by reference as if fully set forth.

BACKGROUND OF THE INVENTION

The present invention relates generally to personal communication devices which facilitate storage and use of user data. More specifically, the invention relates to a method and system wherein data from one personal communication device may be transmitted to another personal communication device.

A personal communication device such as, for example, a cellular telephone, generally permits manual entry of user data through a numeric keypad and through the use of a very limited set of function keys. A user of the personal communication device will typically, and over the course of the life of the device, laboriously enter a database of, but not limited to, names/contacts, addresses, telephone numbers, and related data. The amount of such data that may eventually come to be stored within a personal communication device could be on the order of hundreds of records, each composed of several lines of information. Thus, it would not be unexpected for a personal communication device to contain tens of thousands of characters of user data, or more.

The personal communication device market is constantly evolving, with newer, better, smaller, and lighter models replacing older models. Users of these devices often upgrade from older models to the newer models annually. The user may then enjoy the benefits of the newer model until it too becomes old, and is itself replaced. Each time the user changes personal communication devices, the only way the personal data stored within the older device may be maintained is to manually re-enter the information into the newer device. As noted above, this process is laborious. Furthermore, many users put off upgrading their older personal communication devices due to the unpleasantness associated with transferring all of their user data from the old device to a newer one.

A method and system is therefore needed whereby user data can be easily transmitted between personal communication devices with minimal effort on the part of the user.

SUMMARY

The present invention is a system and method for transmitting user data between personal communication devices. User data may be transmitted between personal communication devices as desired. User data stored in a cellular communications network may also be transmitted between the network and personal communication devices as desired.

BRIEF DESCRIPTION OF THE DRAWING(S)

DETAILED DESCRIPTION OF THE PREFERRED EMBODIMENT(S)

Figure 1:
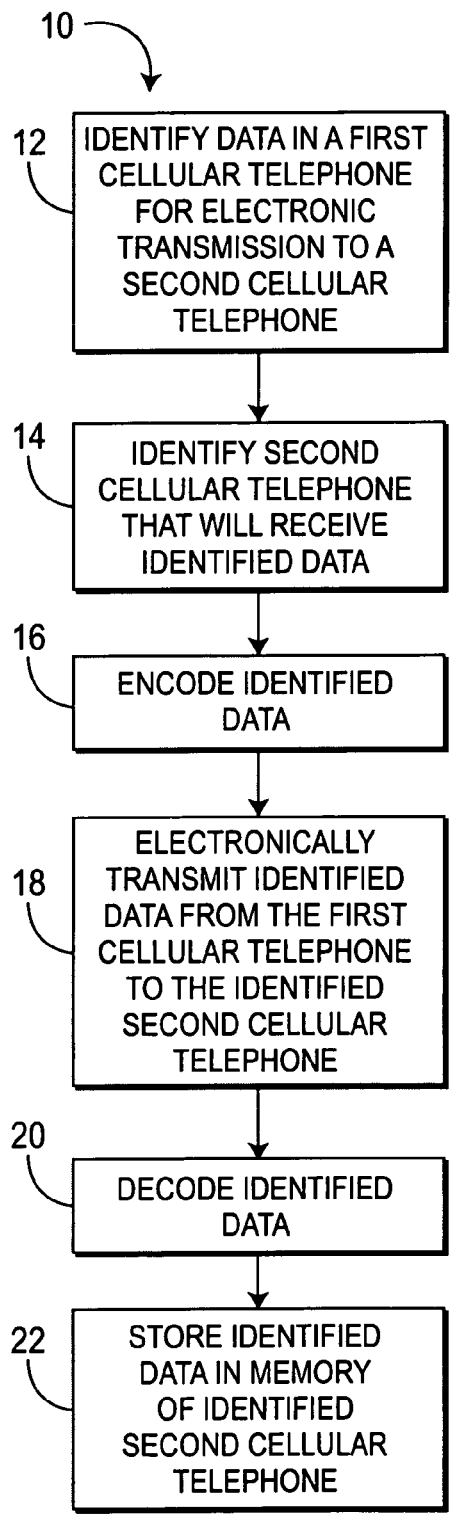
FIG. 1 is a method for transmitting user data between personal communication devices in accordance with an embodiment of the present invention.

Referring initially to FIG. 1, there is shown a method 10 for transmitting user data between personal communication devices such as, for example, cellular telephones and wireless user equipment (UE) in accordance with an embodiment of the present invention. It should be noted that, for purposes of describing the invention, the term between is used so as to include the items being referred to. That is, where the specification states that user data may be transferred between personal communication devices, the term between is used to indicate that user data may be transferred to and from personal communication devices as desired. The same applies where user data is transferred between personal communication devices and cellular communications networks as well as between personal communication devices and any other type of devices or networks.

In accordance with the present invention, when users upgrade from one personal communication device to another, user data may be transferred from the older device to the newer one. Additionally, users may want to transfer user data from their personal communication device to the personal communication device of one or more third parties. User data may be transferred directly between devices (i.e. using hardwired data links or short range wireless point-to-point interfaces, for example) or over a cellular communications network. Where user data is transferred over a cellular communications network, user data may be stored in the network providing an additional benefit of allowing users to transmit their user data from the network to their own cellular telephone in the event of data loss, for example. In each case, unless otherwise noted, a copy of the transmitted data remains in the location from which it was transmitted from.

The method 10 begins in step 12 with identifying user data to transmit from a first cellular telephone to a second cellular telephone. Users may identify the user data that will be transferred as desired. That is, for example, users may choose to transfer all of their data from an older cellular telephone to a newer one or may choose to send a portion of their user data to a cellular telephone of a third party. Of course, users may also identify all of their user data for transmission to a third party.

Users may also select between the type of user data that is transmitted. For example, a third party who shares a mutual friend with a user, may only need a mailing address for the mutual friend. Therefore, in that case, the user would identify for transmission the user data pertaining to the mutual friends' mailing address.

In step 14, the user identifies the second cellular telephone that will receive the electronically transmitted data preferably by dialing the cellular telephone number of the second cellular telephone. Where the second cellular telephone is a cellular telephone of a third party, users preferably enter the cellular telephone number of the third party's cellular telephone into their cellular telephone and execute the "send" key. Where users are transmitting their own user data from an older cellular telephone to a newer one, they may dial the cellular telephone number of the new cellular telephone so as to identify it as the cellular telephone that will receive the identified user data. Where a cellular communications network is used, users may identify their own cellular telephone as the second cellular telephone to reload their user data to their cellular telephone as desired; in the event of data loss for example. In that case, users identify the second cellular telephone by simply dialing their own cellular telephone number and executing the "send" key.

User data may be stored in the network by periodically transmitting user data stored in user cellular telephones to the network where each set of user data is stored and associated with the particular user to which it belongs. The user data stored in the network is available to its respective user for transfer to the user's cellular telephone or the cellular telephone of a third party. Where the user data is not stored in the network, the network simply serves as a medium for transmitting data between two different cellular telephones. That is, where a cellular communications network is used, but user data is not stored therein, the option of reloading data in the event of data loss is not available.

In step 16, the identified data is encoded for electronic transmission to the identified second cellular telephone. The identified data is encoded by a computer processor resident in the first cellular telephone. In step 18, the encoded data is electronically transmitted from the first cellular telephone to the identified second cellular telephone. The encoded data may be transferred to the identified second cellular telephone using any form of electronic transmission as desired. As mentioned, the encoded data may be sent between the first and second cellular telephones over a hardwired data link, a short range wireless point-to-point interface or over a cellular communications network.

In step 20, the user data transmitted to the identified second cellular telephone is decoded by a computer processor resident in the identified second cellular telephone. In step 22, the user data is stored in memory of the identified second cellular telephone where it may be accessed as desired, by the user of the identified second cellular telephone.

Figure 2:
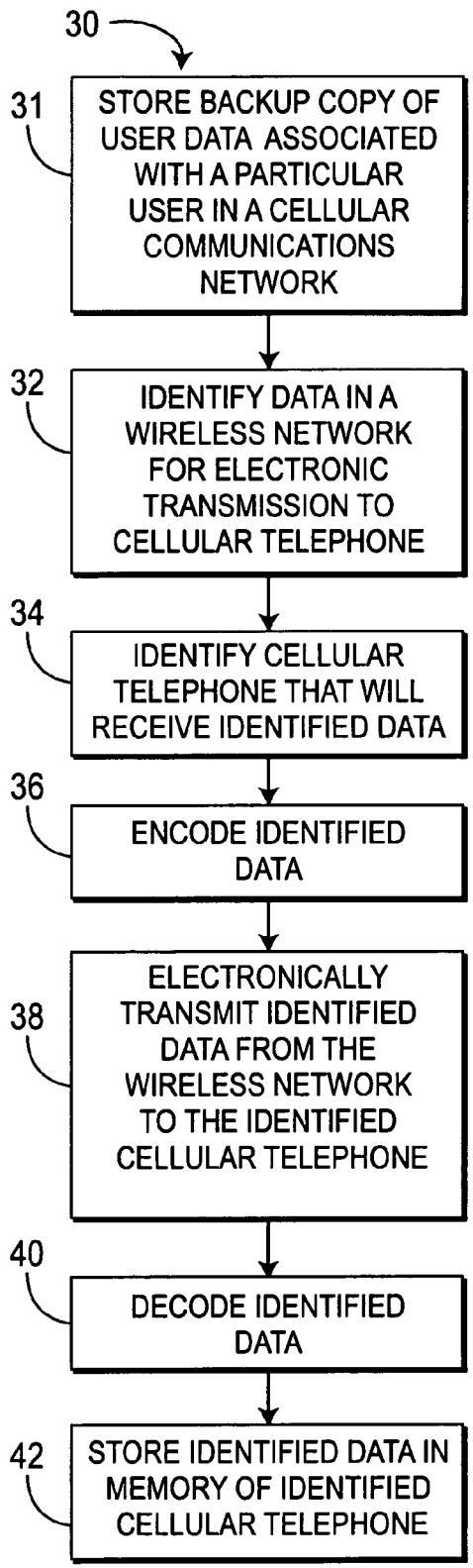
FIG. 2 is a method for transmitting data between a personal communication device and a cellular communications network in accordance with an embodiment of the present invention.

Referring now to FIG. 2, there is shown a method 30 for transmitting data between a personal communication device and a cellular communications network. For purposes of describing FIG. 2, the personal communication device is again, simply by way of example, a cellular telephone. In this embodiment, as is possible in the other embodiments, user data is periodically transmitted from a user's cellular telephone to the cellular communications network. Therefore, a backup copy of user data stored in a user's cellular telephone is stored in the cellular communications network. The backup copy is associated with the particular user to which it belongs and may be password protected to prevent unauthorized access.

The method 30 begins in step 31 where a backup copy of user data associated with a particular user is stored in a cellular communications network. Uploading data from a cellular telephone to its network is well known to those skilled in the art and may be accomplished as desired. By way of example, user data stored in memory of a cellular telephone may be periodically transmitted in an uplink channel to the network.

In step 32, all or a portion of a particular user's user data that is stored in the network may be identified as desired by the particular user for electronic transmission to a cellular telephone. As mentioned, individual groups of user data are associated with particular users. When individual users would like to access their data, they may access the network and log into their account much like they would access their cellular voice mailbox. Once users have gained access to their set of user data, they may identify all or a portion of it for transmission, as desired.

In step 34, the cellular telephone that will receive the identified data is identified. Any type of identifier may be used to identify the cellular telephone that will receive the identified user data. Preferably, the receiving cellular telephone is identified by a cellular telephone number corresponding to the receiving cellular telephone. The cellular telephone number of the receiving cellular telephone may be entered into the cellular telephone from which the user data will be sent. As mentioned, because user data is stored in the network, users may identify their own cellular telephones by entering their cellular telephone number or they may identify third parties by entering the cellular telephone number of a particular third party, as desired.

Once the user data and receiving cellular telephone have been identified, the identified user data is encoded in step 36 for electronic transmission to the identified cellular telephone. The data is then electronically transmitted from the cellular communications network to the identified cellular telephone in step 38. Once the identified user data has been received by the identified cellular telephone, the data is decoded in step 40. The data may be decoded as desired, but is preferably decoded by a processor embedded in the identified cellular telephone. In step 42, the decoded data is stored in memory of the identified cellular telephone and may be used as desired.

Figure 3:
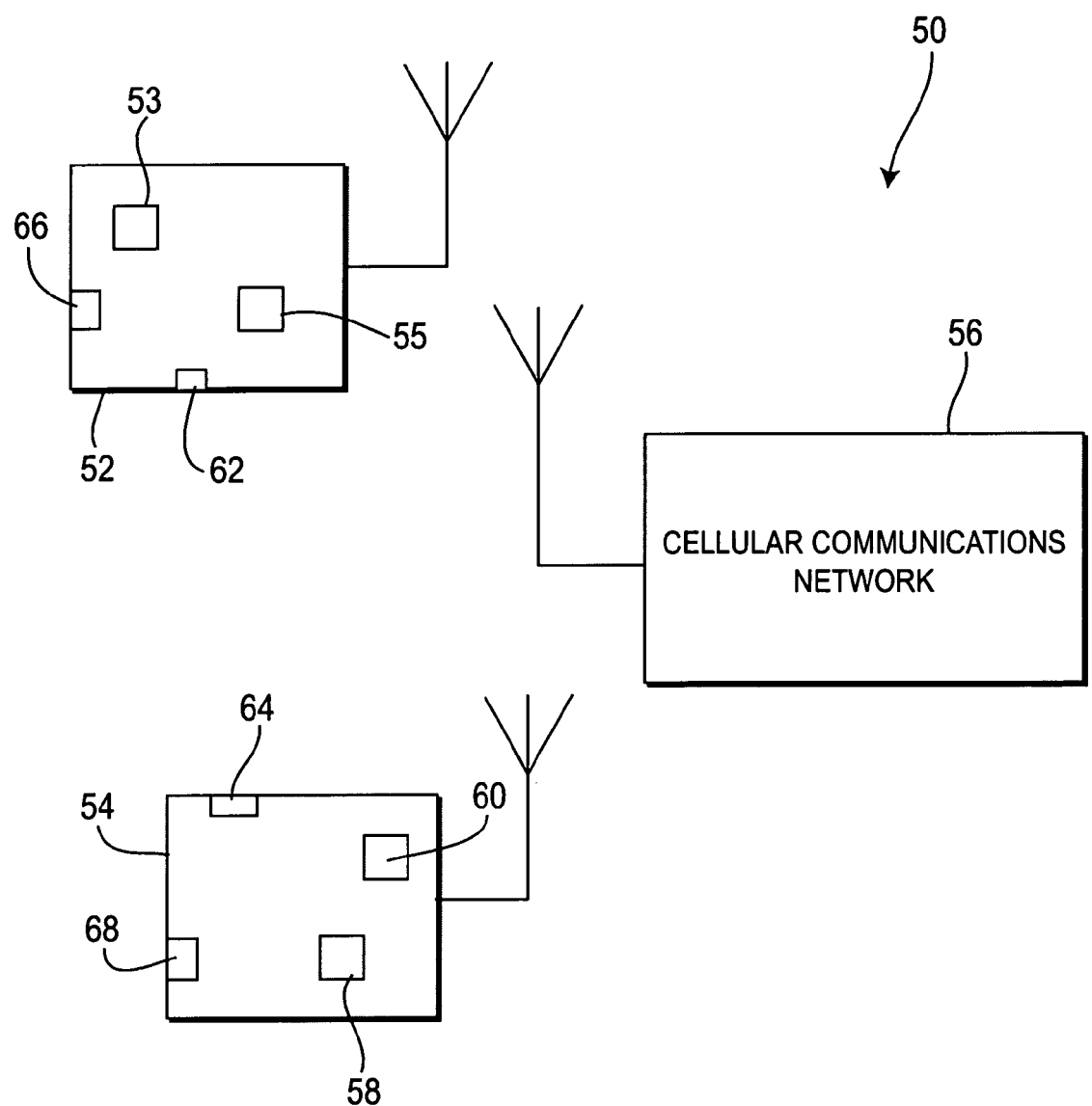
FIG. 3 is a system for transmitting user data stored in personal communication devices in accordance with an embodiment of the present invention.

Referring now to FIG. 3, a system 50 is shown wherein data may be transferred between personal communication devices. Again, the personal communication devices are preferably cellular telephones, but may be any type of personal communication device including, but not limited to, hand held electronic messaging devices, personal digital assistants or any type of device utilizing user data. The system 50, in a first embodiment, comprises a first personal communication device 52 and a second personal communication device 54 wherein data stored in memory 53 of the first device 52 may be electronically transmitted over a cellular communications network 56 to the second device 54. Data stored in the memory 53 of the first device 52 is encoded by a computer processor 55 resident in the first device 52 and sent to the second device 54 over the network 56 in the same fashion as a typical data message. Upon receipt of the encoded data, the second device 54 will decode the data and store it in its memory 58. A computer processor 60 resident in the second device 54 may be used to decode the data received over the network 56.

In another embodiment of the present invention, user data may be stored in the cellular communications network 56 as described in connection with FIG. 2. This allows user data stored in a particular personal communication device to be later transferred to that device, as needed, in the event of data loss, for example. The user data may also be transferred to another personal communication device without having to use the device in which the user data originated. That is, in cases where a personal communication device is lost or stolen, users may use their new device to retrieve their user data from the network and use it as desired.

By way of further example, user data stored in a personal communication device 52 may be stored in a cellular communications network 56 and associated with a particular user. When that user upgrades to a new personal communication device, say device 54, the user may discard device 52 and import her user data directly from the cellular network 56 to the device 54, using only device 54. As mentioned, this embodiment is similarly helpful in the event of data loss. In the event of data loss, users may simply reload their user data from the cellular network 56 and avoid having to manually re-enter the lost data. Reloading data from the network 56 may be accomplished as described in FIG. 2 where users identify their cellular telephone for receipt of user data.

It should be noted that, in accordance with each embodiment of the present invention, user data may be exchanged between networks. That is, by way of example, users may switch carriers wherein user data may be exchanged with or otherwise transmitted between each carrier's respective network. Furthermore, users who activated a personal communication device with one cellular communications network carrier may transmit user data to users who activated a personal communications device with another carrier. Of course, user data may also be transmitted between a plurality of wireless networks belonging to various carriers for any reason as desired with the point being that carrier specific networks do not at all limit implementation of the present invention.

In another embodiment of the present invention, user data may be stored in a separate network other than the cellular communications network or networks belonging to the carrier through which a user's UE was activated or otherwise provided for wireless use. This is particularly useful where users upgrade to a new UE which is serviced by a different carrier than their old UE. The separate network may be any type of network. For example, it may be a separate cellular communications network or any type of computer network. Where the separate network is a computer network, users may upload their user data to a personal computer for storage on the computer network. When users upgrade to a new UE and new carrier, they may simply download their user data from the computer network to their new UE. Users may store their user data in the memory of a personal computer or on any type of device having memory regardless of whether the device is connected to a network.

In this embodiment, users may transmit their user data over a cellular communications network belonging to the carrier through which their UE was activated if the separate network is capable of receiving such transmissions. Otherwise, users may upload their user data to the separate network, computer, or device using a hardwired link, point-to-point wireless interface or any manner for transmitting data from UEs to networks, computers, or other devices having the ability to store data. This allows users to separately store their user data completely devoid of any involvement or interaction with the cellular communications network of the carrier through which their UE was activated or otherwise provided.

In still another embodiment of the present invention, data may be electronically transferred over a wireless point-to-point connection from one personal communication device to another. For example, referring again to FIG. 3, the first and second devices 52, 54 may include infrared ports 62, 64 which facilitate infrared communications and data exchange directly between devices 52 and 54. The ports 62, 64 are capable of sending and receiving data depending on whether their respective personal communication device is transmitting or receiving. Currently, the typical range of an infrared point-to-point connection is zero to one meter, but advances in infrared data exchange are on-going. User data stored in memory 53 of the first device 52 may be encoded by the processor 55 and sent via the infrared port 62 to the second device 54. The user data sent from the first device 52 is received by the infrared port 64 of the second device 54, encoded by the processor 60 and stored in memory 58. It should be noted that processors 55 and 60 are not only capable of encoding and decoding, but also of recognizing whether to encode data for transmission or decode data for storage in memory depending on whether data is being transmitted or received.

In still another embodiment of the present invention data in the first device 52 may be transferred to the second device over a hardwired data interface. In this case, the first device 52 is connected to the second device 54 using a data cable (not shown for simplicity) that is suitable for sending/receiving data between the two devices 52, 54. The data cable is connected to data ports 66, 68 of the first and second devices 52, 54, respectively. User data stored in the memory 53 of the first device 52 is encoded, as desired, by the processor 55. The encoded data is sent via the data cable from the first device 52 to the second device 54. Once received by the second device 54, the user data is decoded by the processor 58 and stored in memory 60 where it may be accessed by the user as desired.

Although the present invention has been described in detail, it is to be understood that the invention is not limited thereto, and that various changes can be made therein without departing from the spirit and scope of the invention, which is defined by the attached claims.

What is claimed is:

1. A method for transmitting user data between cellular telephones that have been activated on different cellular communication network carriers comprising:

selecting a first cellular telephone activated on a first cellular communication network carrier;

identifying user data stored in memory of said first cellular telephone for transmission;

encoding the identified user data at said first cellular telephone;

transmitting the identified user data via radio frequency (RF) signals from said first cellular telephone to the first cellular communication network for storage;

transferring the identified user data stored in the first cellular communication network to a second cellular communication network for storage;

selecting a second cellular telephone activated on the second cellular communication network carrier, wherein the second cellular communication network carrier is different than said first cellular communication network carrier, for reception of the identified user data;

transmitting the identified user data from said cellular communication network to said second cellular telephone;

decoding the transmitted user data at said second cellular telephone; and storing the transmitted user data in memory of said second cellular telephone.

2. The method of claim 1 wherein the selecting step includes entering into the first cellular telephone a cellular telephone number corresponding to the second cellular telephone.

3. The method of claim 1, wherein the identified user data stored in memory of said first cellular telephone is automatically periodically transmitted to said cellular communication network.

4. The method of claim 1, wherein the identified user data is password protected.

* * * * *